(12) United States Patent
Lohse et al.

(10) Patent No.: US 9,523,288 B2
(45) Date of Patent: Dec. 20, 2016

(54) HYDRAULIC BEARING FOR A STATIONARY GAS TURBINE

(75) Inventors: Uwe Lohse, Remscheid (DE); Bernd Prade, Mulheim (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 495 days.

(21) Appl. No.: 14/129,953

(22) PCT Filed: Jun. 11, 2012

(86) PCT No.: PCT/EP2012/060970
§ 371 (c)(1),
(2), (4) Date: Dec. 28, 2013

(87) PCT Pub. No.: WO2013/004451
PCT Pub. Date: Jan. 10, 2013

(65) Prior Publication Data
US 2014/0147258 A1    May 29, 2014

(30) Foreign Application Priority Data

Jul. 6, 2011 (EP) ..................... 11172856

(51) Int. Cl.
| | |
|---|---|
| F01D 25/18 | (2006.01) |
| F01D 25/16 | (2006.01) |
| F01M 11/04 | (2006.01) |
| F16C 33/10 | (2006.01) |

(52) U.S. Cl.
CPC ............... *F01D 25/16* (2013.01); *F01D 25/18* (2013.01); *F01M 11/04* (2013.01); *F05D 2240/127* (2013.01); *F16C 33/1045* (2013.01); *F16C 2360/23* (2013.01)

(58) Field of Classification Search
CPC .......... F01D 25/16; F01D 25/18; F01M 11/04; F01M 11/0408
See application file for complete search history.

(56) References Cited

U.S. PATENT DOCUMENTS

| | | | | |
|---|---|---|---|---|
| 2,616,662 A | * | 11/1952 | Mierley | ........... F01D 9/065 415/199.5 |
| 4,947,963 A | * | 8/1990 | Aho, Jr. | ........... F01D 25/18 184/6 |
| 5,494,355 A | | 2/1996 | Haase | |
| 8,511,057 B2 | | 8/2013 | Fomison et al. | |
| 2004/0216702 A1 | | 11/2004 | Teufl | |

FOREIGN PATENT DOCUMENTS

| | | |
|---|---|---|
| EP | 1544417 A2 | 6/2005 |
| EP | 1873357 A2 | 1/2008 |
| EP | 1923541 A2 | 5/2008 |

(Continued)

*Primary Examiner* — Richard Edgar
(74) *Attorney, Agent, or Firm* — Beusse Wolter Sanks & Maire

(57) ABSTRACT

A hydraulic bearing is provided for a stationary gas turbine that has an oil sump with an outflow for hydraulic oil, wherein the outflow has an outflow opening which is arranged in the oil sump and an outflow line which is connected to the outflow opening. The hydraulic bearing is adapted to bring about an annular flow with a central air column when hydraulic oil flows out in the outflow line.

10 Claims, 4 Drawing Sheets

(56) References Cited

FOREIGN PATENT DOCUMENTS

| | | |
|---|---:|---|
| EP | 2163733 A2 | 3/2010 |
| GB | 2089751 A | 6/1982 |
| JP | H0397512 A | 4/1991 |
| JP | H07508576 A | 9/1995 |
| JP | 201065682 | 3/2010 |
| RU | 2293186 C2 | 2/2007 |
| SU | 832237 A | 5/1981 |
| WO | 0202913 A1 | 1/2002 |

* cited by examiner

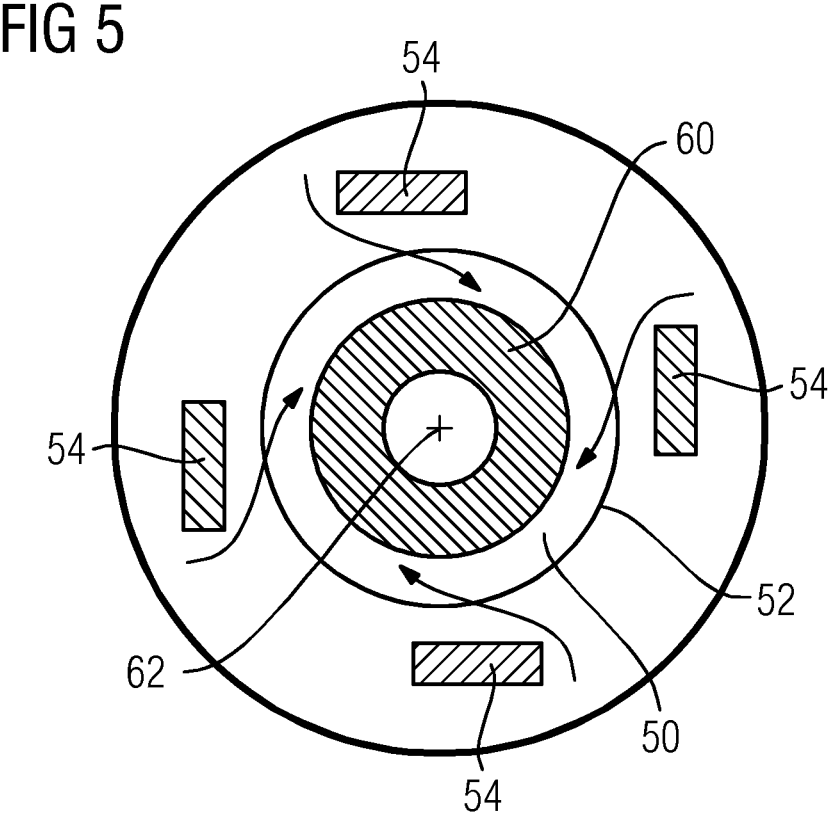

HYDRAULIC BEARING FOR A STATIONARY GAS TURBINE

CROSS REFERENCE TO RELATED APPLICATIONS

This application is the US National Stage of International Application No. PCT/EP2012/060970 filed Jun. 11, 2012, and claims the benefit thereof. The International Application claims the benefit of European Application No. EP11172856 filed Jul. 6, 2011. All of the applications are incorporated by reference herein in their entirety.

FIELD OF INVENTION

The invention relates to a hydraulic bearing for a stationary gas turbine with an oil pan and with an outflow for hydraulic oil.

BACKGROUND OF INVENTION

A generic hydraulic bearing for a gas turbine is known, for example, from WO 02/02913 A1. This hydraulic bearing, while having a narrow construction space, is intended to ensure a reliable outflow of hydraulic oil. For this purpose, a differential pressure is intended to be generated between two flows of the lubricating fluid with the aid of a floating seal and enables the lubricating oil to flow out into the outflow pipes at increased velocity.

In order to achieve a continuous outflow of the lubricating fluid, it is known from EP 2 163 733 A3 to cause the lubricating fluid to flow into the outflow pipe tangentially. However, this design requires a comparatively bulky oil pan, and this is considered to be a disadvantage.

SUMMARY OF INVENTION

An object herein is to provide an alternative hydraulic bearing for a stationary gas turbine, which hydraulic bearing always ensures a reliable outflow of hydraulic oil of a lifting and/or lubricating oil system, while likewise having a compact type of construction, and independently of the operating state of the gas turbine and of internal bearing pressures.

According to embodiments herein, there is provision whereby a generic hydraulic bearing is equipped with means which, when hydraulic oil is flowing out, give rise to an annular flow with a central air column in the outflow line. In other words, the means have the effect that the hydraulic oil flows with a swirl along the wall of the outflow line, so that, inside the outflow line, a central air column can form which reliably prevents a discontinuous outflow and the formation of recurring oil plugs in the outflow line. As a result, air exchange can take place between the oil pan and the following drainage system of the hydraulic bearing, thus reliably ensuring that hydraulic oil flows out at higher velocity independently of the operating pressure or bearing internal pressure of the gas turbine and continuously. Usually, in this case, the outflow line is designed, at least on the oil pan side, as a downpipe which is virtually perpendicular to the horizontal plane, so that gravity acting upon the hydraulic oil causes it to flow out. By virtue of the invention, there is no need to enlarge the cross section of the outflow line.

According to a first advantageous development of the hydraulic bearing, the means comprises guide elements which are arranged around the outflow port and which are arranged obliquely to the radial direction of the outflow port. The guide elements obstruct or, at best, prevent a hydraulic oil flow which flows vertically toward the outflow port. They bring about a tangential inflow of the hydraulic oil into the outflow port and lead to a swirled inflow of the hydraulic oil in the manner of a whirlpool. The guide elements consequently form a swirl body which imparts the tangential velocity component described to the outflowing hydraulic oil. On account of the centrifugal force associated with this, the outflowing hydraulic oil preferably flows along the wall of the outflow line, so that the central air column for pressure equalization can form in the center of the latter. The air column thus prevents the intermittent outflow of hydraulic oil from occurring. The same is achieved if the means comprises alternately offset blocking devices.

According to a further advantageous refinement, the guide elements are fastened to an underside of a disk-shaped plate. The guide elements are consequently always oriented identically with respect to one another and secured against relative displacements. Reliable continuous operation is thereby ensured. The guide elements and the plate are then parts of an insert which can be inserted into existing hydraulic bearings on the pan side. This makes the retrofitting of existing hydraulic bearings easier.

The refinement is especially advantageous in which the means comprises a pipe which extends into the outflow line and which is coaxial to the outflow line. This pipe forms a hollow hub which always makes a connection between the air in an oil return line and the air in the oil pan. This, too, prevents the formation of recurring oil plugs and the accompanying discontinuous outflow in or through the outflow line.

The refinement is especially preferred in which the disk-shaped plate has a central orifice from which the pipe extends into the outflow line. The insert thus formed can also be retrofitted into existing hydraulic bearings in a simple way.

If the circular outflow port is arranged in a planar bottom of the oil pan and the outflow line extends from there initially downward, a compact hydraulic bearing with a local collecting region can be afforded.

Expediently, the oil pan is part of a bearing body which serves for receiving and mounting a rotor of the gas turbine. The use of the hydraulic bearing is especially preferably in a stationary gas turbine in which the outflow line extends through a bearing strut.

BRIEF DESCRIPTION OF THE DRAWINGS

Further advantages and features of the invention are explained by means of the following drawings in which:

FIG. 5 shows the cross section similar to FIG. 4, but with a changed arrangement of guide elements.

DETAILED DESCRIPTION OF INVENTION

Figure 1:
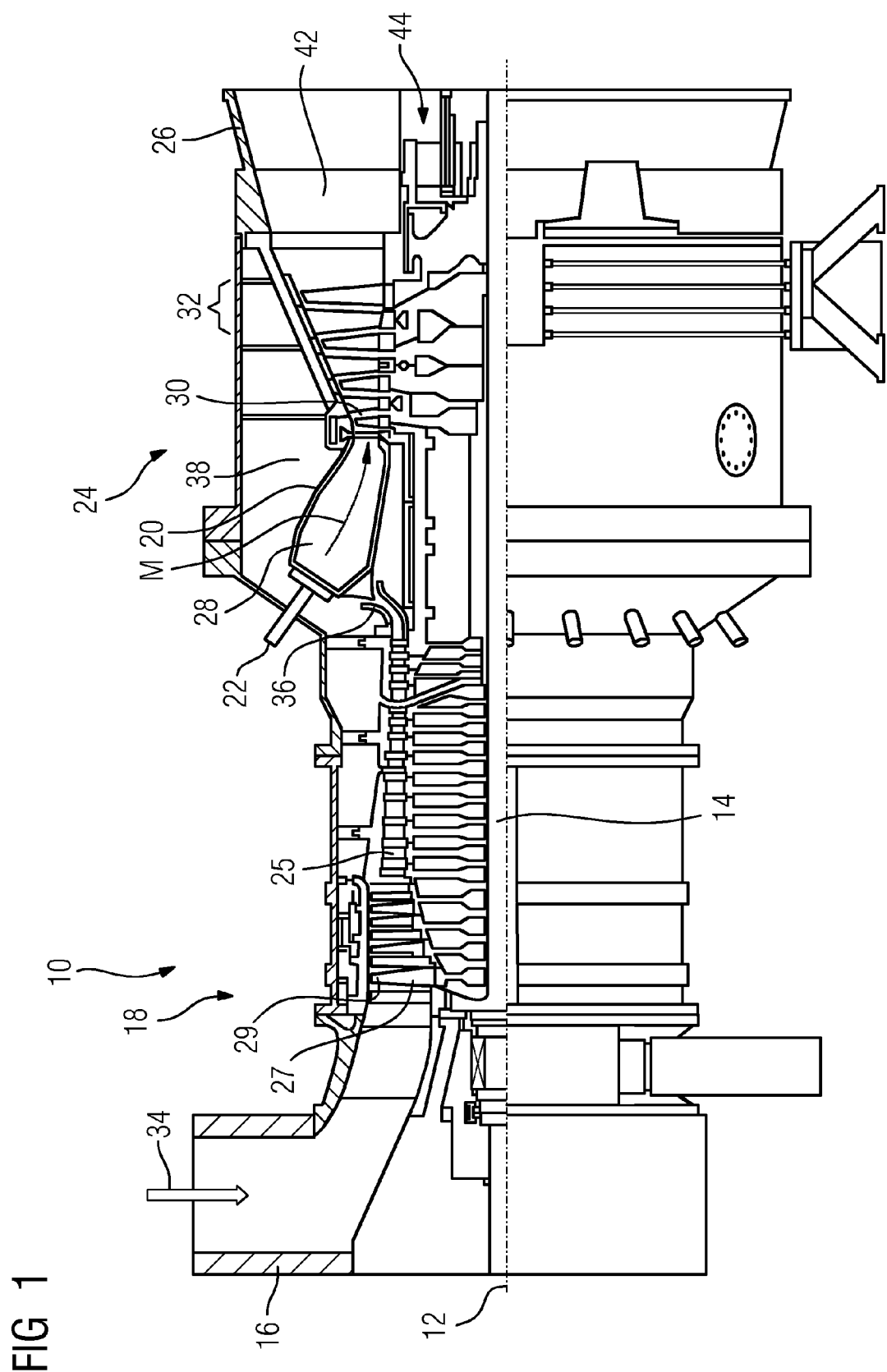
FIG. 1 shows a partial longitudinal cross section through a gas turbine.

FIG. 1 shows a stationary gas turbine 10 in a partial longitudinal section. The gas turbine 10 has inside it a rotor 14 which is mounted rotationally about an axis of rotation 12 and which is also designated as a turbine rotor. An intake housing 16, an axial turbocompressor 18, a toroidal annular combustion chamber 20 with a plurality of burners 22 arranged rotationally symmetrically to one another, a turbine unit 24 and an exhaust gas housing 26 succeed one another along the rotor 14. The gas turbine may also be equipped with a plurality of tubular combustion chambers with one or more burners instead of with an annular combustion chamber 20.

The axial turbocompressor 18 comprises a compressor duct 25 of ring-shaped form with compressor stages succeeding one another in the manner of a cascade therein and composed of moving-blade and guide-vane rings. The moving blades 27 arranged on the rotor 14 lie opposite an outer duct wall of the compressor duct 25. The compressor duct 25 issues via a compressor outlet diffuser 36 in a plenum 38. Provided in the latter is the combustion chamber 20 with its combustion space 28 which communicates with a ring-shaped hot-gas duct 30 of the turbine unit 24.

Four turbine stages 32 connected in series are arranged in the turbine unit 24. A generator or a working machine (not illustrated in either case) is coupled to the rotor 14. However, the number of turbine stages 32 is unimportant for the invention.

When the gas turbine 10 is in operation, the axial turbocompressor 18 sucks ambient air 34 in through the intake housing 16 as a medium to be compressed and compresses this. The compressed air is routed through the compressor outlet diffuser 36 into the plenum 38, from where it flows into the burners 22. Fuel also passes via the burners 22 into the combustion space 28. By the compressed air being added, the fuel is burnt there to form a hot gas M. The hot gas M subsequently flows into the hot-gas duct 30 where it expands so as to perform work at the turbine blades of the turbine unit 24. The energy released in the meantime is taken up by the rotor 14 and utilized, on the one hand, to drive the axial turbocompressor 18 and, on the other hand, to drive a working machine or electric generator.

Figure 2:
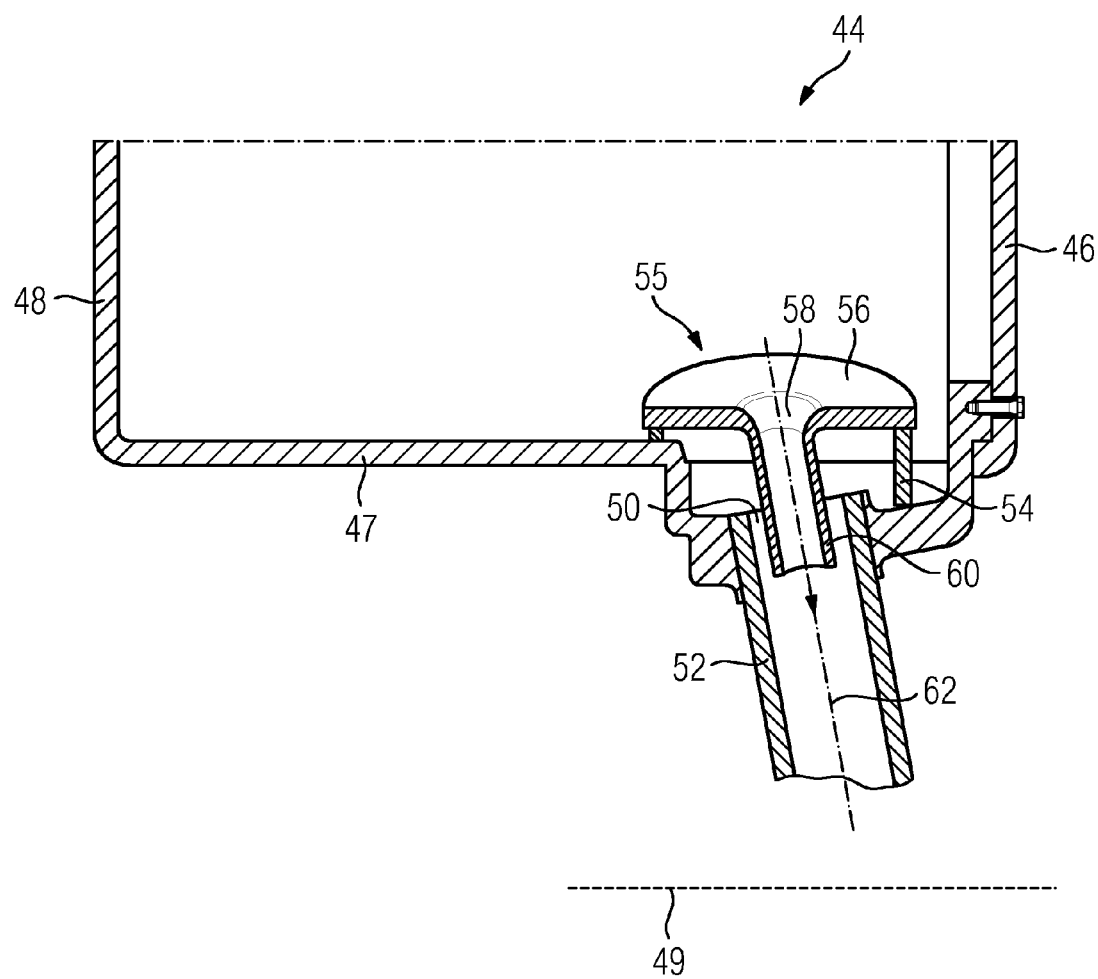
FIG. 2 shows a detail from the longitudinal section through the hydraulic bearing of the gas turbine.

The rotor 14 of the gas turbine 10 is supported at its turbine-side end on the housing 26 via a plurality of bearing struts 42 distributed along the circumference. For this purpose, according to the exemplary embodiment, a hydraulic bearing 44 is seated at the center of the bearing struts 42. The hydraulic bearing 44 is equipped as a radial bearing with corresponding bearing shells, in which the rotor 14 is slidably mounted hydrodynamically with the aid of the hydraulic oil. The bearing shells are arranged inside a bearing body 46 (FIG. 2), the bearing body 46 forming an oil pan 48 in its region which is lower with respect to a horizontal plane 49. In other words, the oil pan 48 is part of the bearing body 46.

The hydraulic oil pressed in between the bearing shells and a rotor running surface for the purpose of lifting the rotor 14 and for the hydrodynamic mounting of the rotor 14 during the operation of the gas turbine 10 is collected in the oil pan 48.

In this case, the hydraulic oil, on account of the gravitational forces acting upon it, runs into the oil pan 48. In the bottom 47 of the oil pan 48 is arranged a circular outflow port 50, on which an outflow line 52 which is vertical, that is to say leads toward the foundation, is arranged. In the exemplary embodiment shown, the outflow line 52 is set at a slight inclination with respect to a radial direction of the gas turbine and extends through a bearing strut 42 (not shown in FIG. 2) arranged in the lower half of the gas turbine 10.

In order to avoid the formation of recurring oil plugs in the outflow line 52 and the accompanying discontinuous outflow of oil, an insert 55 is provided. The insert 55 is illustrated merely diagrammatically in FIG. 2 and comprises a disk-shaped plate 56 with a central orifice 58 and a pipe 60 leading away from the orifice. The pipe 60 extends downward into the outflow line 52. Moreover, the insert 55 comprises on the underside of the plate 56, that is to say on that side of the plate 56 which faces the outflow port 50, supports (FIG. 4) which are distributed uniformly over the circumference of the outflow port 50 and which sit on the pan bottom 47. The insert 55 and its components are also illustrated merely in longitudinal section in FIG. 2.

Figure 3:
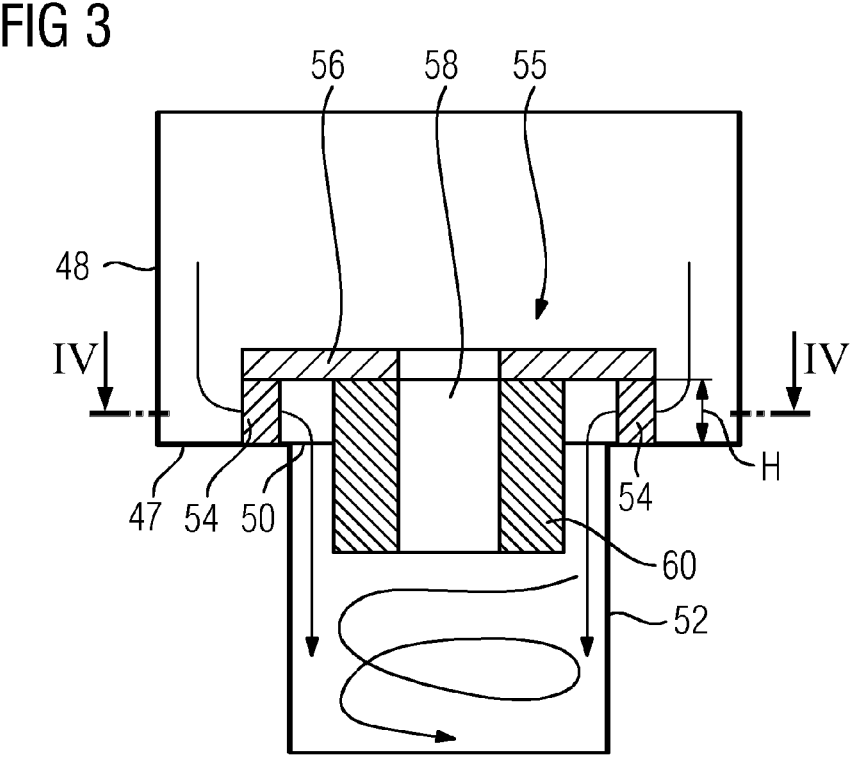
FIG. 3 shows diagrammatically a longitudinal section through an oil pan of the hydraulic bearing with an insert inserted into an outflow port.

The set-up of the oil pan 48 with the insert 55 arranged on or in the outflow port 50 is illustrated diagrammatically in FIG. 3. The hydraulic oil used to lubricate the hydraulic bearing 44 must, after being used, be discharged reliably out of the hydraulic bearing 44. In order to ensure a continuous outflow of hydraulic oil from the oil pan 48 at an increased throughput, two means which bring this about are provided with the aid of the insert 55. On the one hand, the supports are designed as guide elements 54. They prevent outflowing hydraulic oil from flowing mainly radially toward the circular outflow port 50. The guide elements 54 introduce outflowing hydraulic oil tangentially (FIG. 4, FIG. 5) into the outflow port 50, so that the hydraulic oil thereafter flows out with a swirl in the outflow line 52.

The result of this is that the hydraulic oil is laid against the wall of the outflow line 52. On account of this, a central air column can form in the center 62 of the outflow line 52 which air column connects the oil pan 48 to a drainage system following the outflow line 52. On the other hand, the formation of a central air column is also achieved or assisted by the provision of the pipe 60. This means, too, prevents the situation where a hydraulic oil flow flowing completely through the outflow line 52 is established in the center of the outflow port 50 and may possibly lead to the formation of recurring oil plugs when the outflow quantity is temporarily lower.

Figure 4:
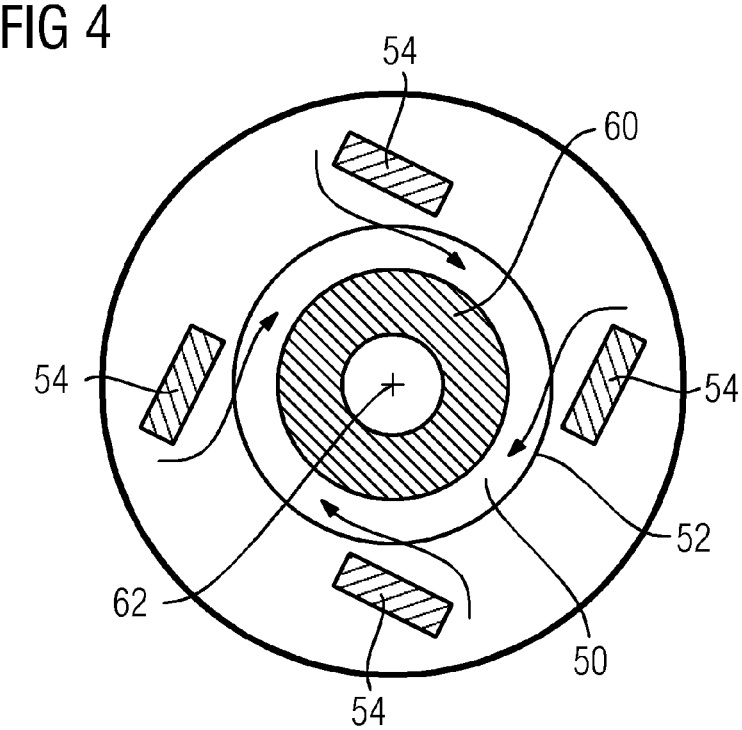
FIG. 4 shows the cross section through the insert along sectional lines IV-IV from FIG. 3.

The guide elements 54 according to the refinement shown in FIG. 5 differ from the guide elements 54 according to the refinement shown in FIG. 4 merely in that they are not oriented obliquely, but parallel or perpendicularly to Cartesian coordinate axes, and at the same time so as to be offset. By such means, too, a ring-shaped outflow flow with a tangential flow component can be achieved.

The guide elements 54 have a height H which is greater than the maximum oil level to be expected in the oil pan 48 during operation. This ensures that the hydraulic oil cannot flow in through the central orifice 58 arranged in the plate 56 and can subsequently flow out through the pipe 60 into the outflow line 52. It is also possible that the pipe 60 may extend upward into the space further than is illustrated. By means of such a pipe which extends through the plate 56, the outflow of the hydraulic oil through the pipe is prevented especially effectively.

At the same time, the guide elements 54 may also be designed as struts, by means of which the pipe 60 arranged coaxially to the outflow line 52 can be fastened via the ring-shaped plate 56.

What is achieved especially reliably, in particular, by the simultaneous use of both means for forming an annular flow of hydraulic oil with a central air column in the outflow line 52 of a hydraulic bearing 44 is that the required throughput of hydraulic oil is always ensured independently of the operating state of the gas turbine 10 and independently of pressure differences between the bearing inner space and the drainage of the oil system in the case of a vertical run-off of oil.

Overall, the invention relates to a hydraulic bearing with an oil pan 48 in which an outflow for hydraulic oil is provided, the outflow comprising an outflow port 50 arranged in the oil pan 48 and an outflow line 52 following the outflow port 50. In order to make it possible to have a reliable outflow of hydraulic oil brought about solely by gravitational force, means are provided which cause hydraulic oil to flow out in the outflow line 52 as an annular flow with a central air column.

The invention claimed is:

1. A hydraulic bearing for a stationary gas turbine, with an oil pan in which an outflow for hydraulic oil is provided, the outflow comprising an outflow port arranged in the oil pan and an outflow line following the outflow port, the hydraulic bearing comprising:
   means to bring about an annular flow with a central air column in the outflow line when hydraulic oil is flowing out;
   wherein the outflow port is of circular configuration and is arranged in a bottom of the oil pan, the outflow line which follows the outflow port extending downward.

2. The hydraulic bearing as claimed in claim 1, wherein the annular flow has a tangential flow component.

3. The hydraulic bearing as claimed in claim 1, wherein the means comprises guide elements which are arranged around the outflow port and which are arranged obliquely to a radial direction of the outflow port.

4. The hydraulic bearing as claimed in claim 3, wherein the guide elements are arranged on an underside of a disk shaped plate.

5. The hydraulic bearing as claimed in claim 1, wherein the means comprises alternately offset blocking devices.

6. The hydraulic bearing as claimed in claim 1, wherein the means comprises a pipe which extends into the outflow line and which is coaxial to the outflow line.

7. The hydraulic bearing as claimed in claim 4, wherein the means further comprises a pipe which extends into the outflow line and which is coaxial to the outflow line, and wherein the disk shaped plate has a central orifice which is followed by the pipe.

8. The hydraulic bearing as claimed in claim 7, wherein the pipe extends through the disk shaped plate.

9. The hydraulic bearing as claimed in claim 1, wherein the oil pan is part of a bearing body which serves for receiving and mounting a rotor of the gas turbine.

10. A gas turbine with a hydraulic bearing as claimed in claim 1, wherein the outflow extends through a bearing strut.

* * * * *